(12) United States Patent
Meenakshisundaram et al.

(10) Patent No.: US 11,028,881 B2
(45) Date of Patent: Jun. 8, 2021

(54) BEARING LUBRICATION APPLICATION CONTROL SYSTEM WITH LUBRICATION VOLUME SCHEDULING

(71) Applicant: VAP AUSTRALIA PTY LTD, Ingleburn (AU)

(72) Inventors: Annamalai Meenakshisundaram, Ingleburn (AU); Raghunathan Ramakrishnan, Ingleburn (AU); Parthiban Ramakrishnan, Ingleburn (AU)

(73) Assignee: VAP AUSTRALIA PTY LTD, Ingleburn (AU)

( * ) Notice: Subject to any disclaimer, the term of this patent is extended or adjusted under 35 U.S.C. 154(b) by 239 days.

(21) Appl. No.: 16/342,339

(22) PCT Filed: Oct. 17, 2017

(86) PCT No.: PCT/AU2017/051119
§ 371 (c)(1),
(2) Date: Apr. 16, 2019

(87) PCT Pub. No.: WO2018/071960
PCT Pub. Date: Apr. 26, 2018

(65) Prior Publication Data
US 2019/0257360 A1    Aug. 22, 2019

(30) Foreign Application Priority Data

Oct. 17, 2016    (AU) .................................. 2016904193

(51) Int. Cl.
*F16N 7/38*       (2006.01)
*F16C 33/66*      (2006.01)
(Continued)

(52) U.S. Cl.
CPC ...... *F16C 33/6659* (2013.01); *F16C 33/6625* (2013.01); *F16C 33/6674* (2013.01);
(Continued)

(58) Field of Classification Search
None
See application file for complete search history.

(56) References Cited

U.S. PATENT DOCUMENTS 5,856,931 A * 1/1999 McCasland ............ G06Q 10/06
702/182
2007/0144834 A1* 6/2007 Matzan .................. H02K 35/02
184/37
(Continued)

OTHER PUBLICATIONS

English translation of Saint-Saint-Mard et al. WIPO Publication No. WO 2013/135742 (2013).*
(Continued)

*Primary Examiner* — Bernard G Lindsay
(74) *Attorney, Agent, or Firm* — Innovation Capital Law Group, LLP; Vic Lin

(57) ABSTRACT

There is provided a bearing lubrication application control system which comprises a digital controller device operably coupled to a lubrication meter and a computer readable medium reader. As such, during lubrication application, the digital controller device is configured for reading bearing data from bearing computer readable media associated with each bearing and also recording an applied lubrication volume for each of the bearings. As such, for a subsequent lubrication application, the digital controller device is configured for calculating a dynamic lubrication schedule for each of the bearings wherein the schedule comprises at least an appropriate lubrication volume to be applied calculated at least according to the stored apply lubrication volume for each of the plurality of bearings.

15 Claims, 3 Drawing Sheets

(51) Int. Cl.
*F16N 29/02* (2006.01)
*G05B 19/4155* (2006.01)
*F16N 27/00* (2006.01)

(52) U.S. Cl.
CPC .............. *F16N 7/38* (2013.01); *F16N 27/00* (2013.01); *F16N 29/02* (2013.01); *G05B 19/4155* (2013.01); *F16N 2210/14* (2013.01); *F16N 2230/02* (2013.01); *F16N 2270/20* (2013.01); *F16N 2270/70* (2013.01); *G05B 2219/49043* (2013.01)

(56) References Cited

U.S. PATENT DOCUMENTS

| | | | |
|---|---|---|---|
| 2011/0153094 A1 | 6/2011 | Botha | |
| 2012/0221153 A1* | 8/2012 | Emlind | F01M 1/14 700/283 |
| 2012/0316796 A1* | 12/2012 | Goodman | G01M 13/028 702/39 |
| 2013/0015019 A1* | 1/2013 | Kuvaja | F16N 7/38 184/26 |
| 2016/0178121 A1 | 6/2016 | Conley et al. | |
| 2017/0362959 A1* | 12/2017 | Suciu | F02C 7/06 |
| 2019/0040998 A1* | 2/2019 | Wride | F16N 3/12 |

OTHER PUBLICATIONS

International Search Report dated Dec. 18, 2017 from corresponding PCT Application No. PCT/AU2017/051119.

* cited by examiner

BEARING LUBRICATION APPLICATION CONTROL SYSTEM WITH LUBRICATION VOLUME SCHEDULING

FIELD OF THE INVENTION

This invention relates generally to bearing lubrication maintenance more particularly, this invention relates to a bearing lubrication application control system.

BACKGROUND OF THE INVENTION

Industrial infrastructure may comprise a plurality of machinery bearings each requiring regular lubrication for the smooth and continuous operation thereof.

Present bearing maintenance is presently problematic in that bearings may require servicing at different times and differing types of bearings require differing volumes of lubrication and/or differing types of lubrication. Furthermore, lubrication consumption may depend on operational parameters.

As such, given this potential number of permutations, especially for a large number of bearings, it is very difficult to efficiently maintain industrial bearings. As a result, industrial bearings are either under or over serviced both of which are problematic for obvious reasons.

The present invention seeks to provide a way to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a bearing lubrication application control system which comprises a digital controller device operably coupled to a lubrication meter and a computer readable medium reader.

As such, during lubrication application, the digital controller device is configured for reading bearing data from bearing computer readable media associated with each bearing and also recording an applied lubrication volume for each of the bearings.

As such, for a subsequent lubrication application, the digital controller device is configured for calculating a dynamic lubrication schedule for each of the bearings wherein the schedule comprises at least an appropriate lubrication volume to be applied calculated at least according to the stored apply lubrication volume for each of the plurality of bearings.

As such, with the foregoing in mind, in accordance with one aspect, there is provided a bearing lubrication application control system comprising: a controller device comprising memory; a lubrication meter interface operably coupling a lubrication meter to the controller device; a reader interface operably coupling a computer readable medium reader to the controller device wherein, in use: for a first lubrication application, for each of plurality of bearings: the controller device is configured for reading bearing data comprising at least a bearing identifier from a bearing computer readable media using the reader; the controller device is configured for measuring an applied lubrication volume using the lubrication meter when the lubrication meter is fluidly coupled between a lubrication reservoir and the respective bearing; and the controller device is configured for storing the applied lubrication volume in the memory in relation to the bearing identifier; and for a second lubrication application: the controller device is configured for calculating a lubrication schedule comprising an appropriate lubrication volume for each of the each of plurality of bearings, the appropriate lubrication volume calculated at least according to the stored applied lubrication volume for each of the plurality of bearings.

The control system may further comprise a lubrication pump interface operably coupling a lubrication pump to the controller device and wherein the controller device may be further configured for controlling the lubrication pump according to the appropriate lubrication volume and the applied lubrication volume.

For the second lubrication application, the controller may be configured for reading the bearing identifier of a bearing and retrieving the applied lubrication volume associated with the bearing identifier from memory and calculating the appropriate lubrication volume according to the retrieved applied lubrication volume.

The controller device may be configured for ascertaining a bearing type in accordance with the bearing identifier and wherein the controller device may be further configured for calculating the appropriate lubrication volume according to the bearing type.

The controller device may be operably coupled to a server across a data network and wherein the controller device may be configured for calculating the appropriate lubrication volume according to the bearing type utilising data retrieved from the server.

The controller device may be further configured for calculating the appropriate lubrication volume in accordance with operational data.

The operational data may be set within memory of the controller device.

The control system may further comprise a plurality of operational sensors operably coupled to the bearings and wherein, in use, the controller device may be configured for reading operational data obtained from the operational sensors and calculating the appropriate lubrication volume according to the operational data.

The operational data may comprise operational usage data.

The operational usage data may comprise at least one of a number of revolutions and duty time.

The operational data may comprise operational characteristic data.

The operational characteristic data may comprise at least one of vibration and sound operational characteristic data.

The controller device may be configured for analysing at least one of the frequency and amplitude of the operational characteristic data for determining the appropriate location volume.

The system may further comprise a plurality of lubrication reservoirs comprising differing lubrication types and a respective plurality of lubrication pumps fluidly coupled to the plurality of lubrication reservoirs and wherein, in use, the controller may be configured for controlling one of the plurality of lubrication pumps according to the appropriate lubrication type.

The controller device may be further configured for optimising a travel path of the schedule according to locations of the bearings.

The controller device may be further configured for optimising the schedule according to lubrication type.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
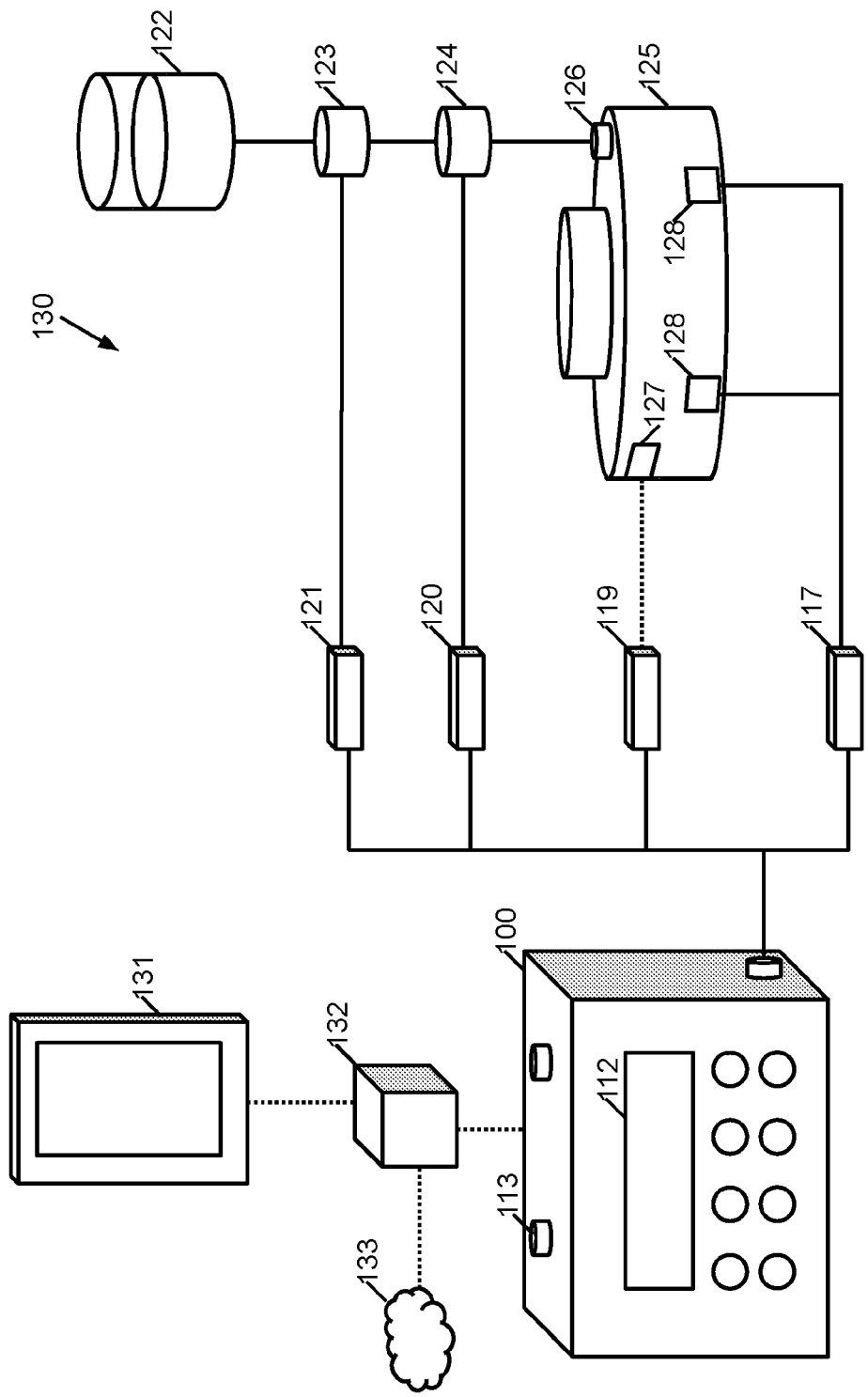
FIG. 1 shows a bearing lubrication application control system in accordance with an embodiment.

FIG. 1 shows an exemplary layout of bearing lubrication application control system 130 in accordance with an embodiment.

The system 130 comprises a digital controller device 100. In a preferred embodiment, the controller device 100 takes the form of a small form factor ruggedised computer device suited for industrial utilisation. Furthermore, the system 130 comprises a lubrication meter interface 120 operably coupling a lubrication meter 124 to the controller device 100. As will be described in further detail below, the lubrication mater 124 is configured for measuring an applied lubrication volume. The lubrication meter interface 120 may take the form of a wired or wireless interface.

Furthermore, the system 130 comprises a reader interface operably coupling a reader 119 to the controller device 100. The reader 119 is configured for reading data from computer readable media 127 associated with each bearing.

In one embodiment, the reader 119 is an RFID reader configured for reading data from an RFID tag 127. However, it should be noted other embodiments may utilise other types of computer readable media, including NFC tags, Bluetooth beacons and the like and even optical readable media such as 2D barcodes and the like.

As such, with this particular configuration, for a first lubrication application, the controller device 100 is configured for reading bearing data from the bearing computer readable media 127 for each bearing 125 using the reader 119. The controller device 100 is further configured for measuring an applied lubrication volume utilising the lubrication mater 124 when the lubrication mater 124 is fluidly coupled between a lubrication reservoir 122 and a grease nipple 126 of the bearing 125.

The controller device 100 is configured for storing the applied lubrication volume in memory in association with each bearing.

As such, for subsequent lubrication applications, the controller 100 is configured for calculating a lubrication schedule. Specifically, the lubrication schedule specifies the bearings 125 to be lubricated and, preferably, an appropriate lubrication volume for each bearing 125 calculated at least according to the stored applied lubrication volumes stored within the memory of the controller 100.

In embodiments, the controller 100 may comprise indicator lights 113 indicative of the reaching of the appropriate lubrication volume. In embodiment, a pair of lights 113 may be provided, one being red and one being green such that, when the applied lubrication volume meets the appropriate lubrication volume, the green light illuminates. In embodiments, the controller device 100 may comprise a user interface comprising a digital display 112 for the display of digital data. The interface may further comprise a keypad.

In embodiments, the system 130 further comprises a pump interface 121 operably coupling a lubrication pump 123 to the controller device 100. As such, in this embodiment, the controller device 100 may itself control the pumping of lubrication utilising the lubrication pump 123. As such, in accordance with this embodiment, the controller device may control the lubrication pump 123 until such time that the appropriately lubrication volume has been applied.

In embodiments, the system 130 may comprise a plurality of lubrication reservoirs 122 comprising differing types of lubrication. As such, in use, the controller device 100 may display to the technician, via the digital display 120, the correct lubrication reservoir 122 to connect to the pump 123 or the lubrication meter 124. In embodiments, the system 100 may comprise a lubrication pump 123 fluidly coupled to each reservoir 122 such that the controller device 100 itself controls the appropriate pump for the appropriate reservoir 122.

In an embodiment, the bearing data stored on the computer readable media 127 comprises a bearing identifier. As such, the controller device 100 may store the applied lubrication volume in relation to the bearing identifier for subsequent reference.

In embodiments, additional data may be stored within the readable media 127 or retrieved utilising the bearing identifier. Such additional data may comprise bearing type data indicative of the type of bearing. In this embodiment, the computer readable media 127 may control the lubrication schedule depending on the type of bearing.

In embodiments, bearings 125 may require differing volumes of lubrication depending on operational parameters.

Such operational parameters may comprise actual usage. In one embodiment, the actual usage may be set in accordance with the known operation of the system.

However, for dynamically detecting actual usage, the system 130 may comprises a plurality of operational sensors 128 operably coupled to each respective bearing 125. An operational sensor interface 117 operably couples the operational sensors 128 to the controller device 100.

As such, in accordance with this embodiment, the controller device 100 is configured for dynamically monitoring the actual operational usage of the bearings 125 for determining the appropriate amount of lubrication. The sensors 128 may be configured for monitoring number of rotations or duty cycle, each being indicative of actual usage.

In further embodiments, the sensors 128 may be configured for dynamically monitoring the operational condition of the bearings 125. For example, the sensors 128 may comprise accelerometers for detecting vibration or acoustic transducers for detecting ultrasound, wherein excessive vibration or noise may be indicative of low lubrication levels. As such, for bearings 125 exhibiting such characteristics, the controller device 100 may be configured for applying lubrication or applying a greater volume of lubrication. In embodiments, the controller 100 may be configured for analysing the vibrational or soundwave forms received by the sensors 128 so as to ascertain aberrant operational characteristics which may be indicated by certain frequencies or amplitudes.

In embodiments, the sensors 128 may store data locally which is read at the time of application by the sensor interface 117. Alternatively, the sensor data may be stored remotely such that when the bearing identifier is read from the media 127, the applicable sensor data may be retrieved accordingly.

In embodiments, the controller device 100 may interface with a personal computing device 131 across a network gateway 132 or directly such as via Bluetooth. The personal computing device 131 may take the form of a mobile communication device for which the functionality thereof may be configured for present purposes by way of a downloadable software application ("app"). As such, utilising the computing device 131, the technician may view various data and configure various operational settings.

In further embodiments, the controller device 100 may interface with a cloud-based server 133. In this manner, the server 123 may be configured for storing various data and configurational settings for the system 130.

Furthermore, the server 133 may be configured for storing the applied lubrication volume data which may allow for the deployment of a plurality of controller devices 100 thereby avoiding duplicative lubrication application.

Figure 2:
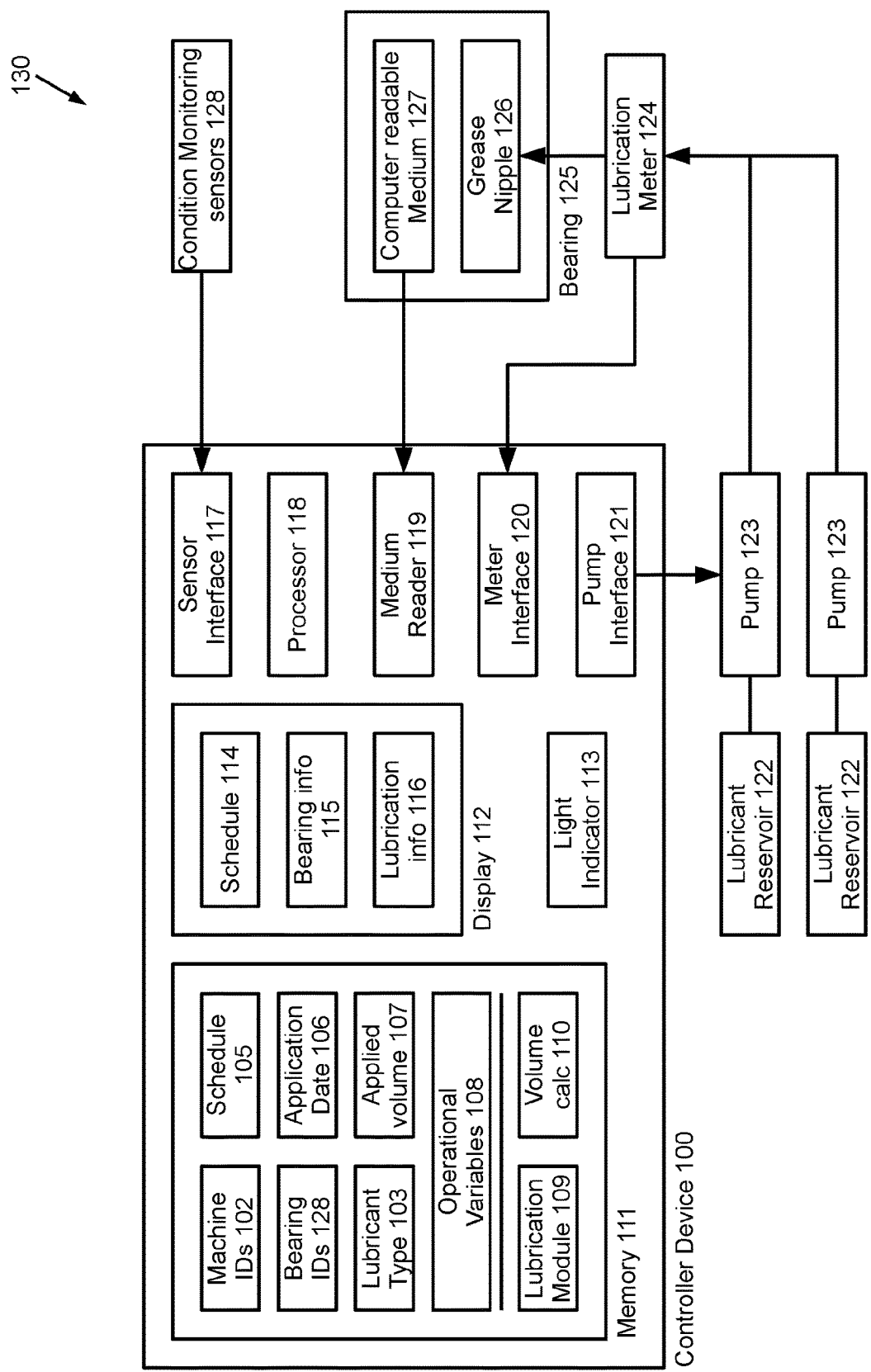
FIG. 2 shows a functional schematic of the bearing lubrication application control system in accordance with an embodiment.

FIG. 2 shows a functional schematic of the system 130. As can be seen, the controller device 100 comprises a processor 118 for processing digital data. In operable communication with the processor 118 across a system bus is a memory device 111. The memory device 111 is configured for storing digital data including computer program code instructions and associated data. As such, in use, the processor 118 is configured for fetching these computer program code instructions and associated data for interpretation and execution.

In the embodiment shown, the computer program code instructions have been shown as having been logically divided into various computer program code modules and associated data.

As is shown, the computer program code instruction modules may comprise a lubrication module 109 for controlling the lubrication application process in accordance with data received from the lubrication meter 124 and the computer readable media 127. The modules may further comprise a volume calculation module 110 configured for calculating the appropriate lubrication volume to be applied in the manner provided herein.

Various data may be stored within the memory device also. Specifically, there is shown a plurality of bearing identifiers 128 associated with a plurality of machine identifiers 102. Furthermore, differing lubrication types 103 may be stored also.

The data may comprise applied volumes 107 stored in relation to the bearing identifiers 128. As such, the applied volume 107 may be subsequently retrieved during later application stages the compilation of the application schedule. Additionally, lubrication application dates 106 may be stored. The modules may further comprise a schedule calculation module (not shown) for the dynamic compilation of application schedules.

Furthermore, various operational variables 108 may be stored in relation to the bearing identifiers 128. As alluded to above, these operational variables 108 may represent variables material for the determination of the schedules appropriate lubrication volume to be applied to the bearings. Such operational variables 108 may include bearing parameters, and operational parameters including operational usage and characteristic operational parameters as alluded to above.

The memory 111 may further store the calculated schedules 114.

As is further shown, the display 112 may display various information to the technician in use, including bearing specific information 115 and lubrication specific information 116.

Furthermore, the display 112 may display the calculated schedule 114. A schedule 114 may direct the technician to the bearings 125 requiring lubrication and the volume of lubrication to be applied.

In embodiments, the schedule displays an appropriate application sequence so as to derive efficiencies with respect to path travelled, lubrication type to be applied and the like. Specifically, the sequence may comprise a sequence allowing for the application of a first type of lubricant according to a shortest travel path followed by a second type of lubricant (which may require the technician reconfiguring the reservoir connections) again according to a shortest travel path. In embodiments, the schedule path may be configured by the operator.

Figure 3:
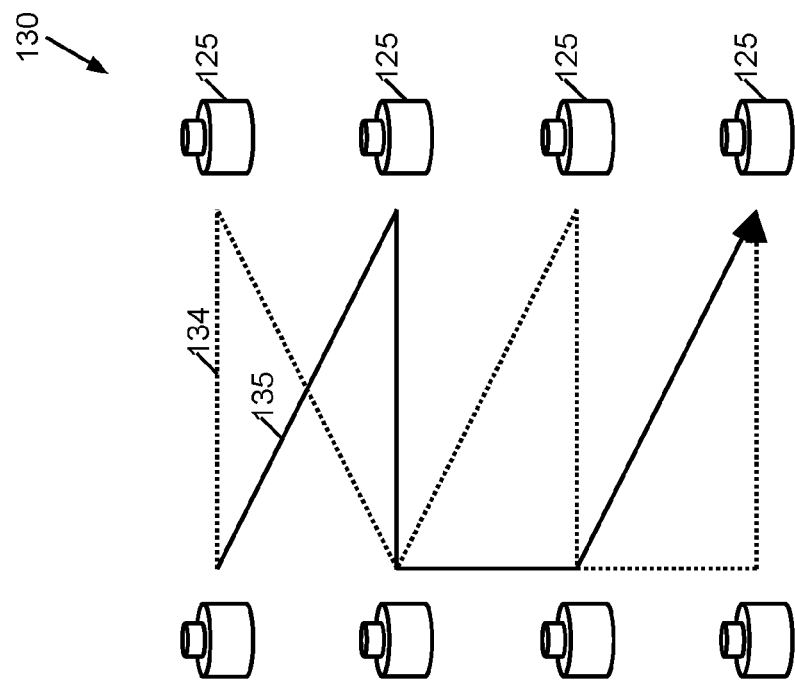
FIG. 3 shows exemplary dynamic lubrication schedules calculate by the controller device of the system in accordance with an exemplary embodiment.

FIG. 3 illustrates differing lubrication schedules for a plurality of bearings 125 in an industrial complex.

As can be seen, the lubrication schedule may comprise a first lubrication schedule 135 which may be conducted at a first time and a second lubrication schedule 134 which may be conducted at a second time. Alternatively, the lubrication schedules may be performed by differing technician simultaneously. As can be seen from the embodiment shown, the lubrication schedule is 134, 135 may take the shortest path between the bearings.

In this manner, the implementation of scheduling increases the efficiency of the lubrication process in that the operator need not necessarily visit each bearing 125 in turn. Rather, the schedule would direct the operator to visit only those bearings 125 requiring application of lubrication.

As alluded to above, each bearing 125 may require different types of lubrication at differing time and depending on various parameters including bearing type and various operational parameters unclosing bearing usage and bearing characteristics and the like.

As such, the calculated lubrication schedule may dynamically change over time.

As alluded to above, the lubrication schedule may be dynamically calculated to confer efficiencies in travel distance, lubrication type and other relevant parameters. For example, the locations of the bearings 125 may be stored within the operational variables 108 of the memory 111 of the controller 100. As such, when completing the schedule, the controller 100 would dynamically calculate a schedule so as to reduce travel distance between the bearings such that the operator is not necessarily walking back and forth across the plant applied lubrication. Additionally, and especially where reconfiguration of the lubrication equipment is required for application of different types of lubrication, the controller device 100 may control the schedule to firstly allow the application of a first type of lubrication followed by a second type of lubrication. As such, the technician may perform a first lubrication application with a first type with a second type of lubrication, then reconfigure the reservoir 122 connection and then performed a second lubrication application with a second type of lubrication.

It should be noted that the configuration 130 is shown in FIG. 1 may be varied within the purposive scope of the in embodiments provided herein.

Specifically, in accordance with a first variation, the lubrication meter 124 and the reader 119 may communicate wirelessly with the controller device 100. Furthermore, the controller device 100 may communicate with the personal computing device 131, such as by way of Bluetooth or the like and wherein the personal computing device 131 communicates with the cloud server 133.

In accordance with a second variation, the functionality may be implemented primarily by the personal computing device 131. Specifically, in accordance with this embodiment, the reader 119 and the lubrication meter 124 may communicate with the personal computing device 131 wirelessly, such as utilising Bluetooth. Furthermore, the personal computing device 131 may comprise a software application "app" for implementing the various functionality described herein and the personal computing device 131 may communicate with the server 133.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A bearing lubrication application control system comprising:
   a controller device comprising memory;
   a lubrication meter interface operably coupling a lubrication meter to the controller device;
   a plurality of lubrication reservoirs comprising differing lubrication types and a respective plurality of lubrication pumps fluidly coupled to the plurality of lubrication reservoirs and wherein, in use, the controller is configured for controlling one of the plurality of lubrication pumps according to the appropriate lubrication type; and
   a reader interface operably coupling a computer readable medium reader to the controller device wherein, in use:
   for a first lubrication application, for each of plurality of bearings:
      the controller device is configured for reading bearing data comprising at least a bearing identifier from a bearing computer readable media using the reader;
      the controller device is configured for measuring an applied lubrication volume using the lubrication meter when the lubrication meter is fluidly coupled between a lubrication reservoir and the respective bearing; and
      the controller device is configured for storing the applied lubrication volume in the memory in relation to the bearing identifier; and
   for a second lubrication application:
      the controller device is configured for calculating a lubrication schedule comprising an appropriate lubrication volume for each of the each of plurality of bearings, the appropriate lubrication volume calculated at least according to the stored applied lubrication volume for each of the plurality of bearings.

2. The control system as claimed in claim 1, further comprising a lubrication pump interface operably coupling a lubrication pump to the controller device and wherein the controller device is further configured for controlling the lubrication pump according to the appropriate lubrication volume and the applied lubrication volume.

3. The control system as claimed in claim 1, wherein, for the second lubrication application, the controller is configured for reading the bearing identifier of a bearing and retrieving the applied lubrication volume associated with the bearing identifier from memory and calculating the appropriate lubrication volume according to the retrieved applied lubrication volume.

4. The control system as claimed in claim 1, wherein the controller device is configured for ascertaining a bearing type in accordance with the bearing identifier and wherein the controller device is further configured for calculating the appropriate lubrication volume according to the bearing type.

5. The control system as claimed in claim 4, wherein the controller device is operably coupled to a server across a data network and wherein the controller device is configured for calculating the appropriate lubrication volume according to the bearing type utilising data retrieved from the server.

6. The control system as claimed in claim 1, wherein the controller device is further configured for calculating the appropriate lubrication volume in accordance with operational data.

7. The control system as claimed in claim 6, wherein the operational data is set within memory of the controller device.

8. The control system as claimed in claim 5, further comprising a plurality of operational sensors operably coupled to the bearings and wherein, in use, the controller device is configured for reading operational data obtained from the operational sensors and calculating the appropriate lubrication volume according to the operational data.

9. The control system as claimed in claim 8, wherein the operational data comprises operational usage data.

10. The control system as claimed in claim 9, wherein the operational usage data comprises at least one of a number of revolutions and duty time.

11. The control system as claimed in claim 9, wherein the operational data comprises operational characteristic data.

12. The control system as claimed in claim 11, wherein the operational characteristic data comprises at least one of vibration and sound operational characteristic data.

13. The control system as claimed in claim 12, wherein the controller device is configured for analysing at least one of the frequency and amplitude of the operational characteristic data for determining an appropriate lubrication volume.

14. The control system as claimed in claim 1, wherein the controller device is further configured for optimising a travel path of the schedule according to locations of the bearings.

15. The control system as claimed in claim 1, wherein the controller device is further configured for optimising the schedule according to lubrication type.

* * * * *